United States Patent
Tokue et al.

(10) Patent No.: US 12,540,248 B2
(45) Date of Patent: Feb. 3, 2026

(54) METAL SURFACE-TREATING AGENT, AND METAL MATERIAL WITH COATING FILM AND METHOD FOR MANUFACTURING SAME

(71) Applicant: Nihon Parkerizing Co., Ltd., Tokyo (JP)

(72) Inventors: Masaru Tokue, Tokyo (JP); Yohei Otsu, Tokyo (JP); Tomohiro Iko, Tokyo (JP)

(73) Assignee: Nihon Parkerizing Co., Ltd., Tokyo (JP)

( * ) Notice: Subject to any disclaimer, the term of this patent is extended or adjusted under 35 U.S.C. 154(b) by 722 days.

(21) Appl. No.: 17/776,266

(22) PCT Filed: Nov. 11, 2020

(86) PCT No.: PCT/JP2020/042131
§ 371 (c)(1),
(2) Date: May 12, 2022

(87) PCT Pub. No.: WO2021/131374
PCT Pub. Date: Jul. 1, 2021

(65) Prior Publication Data
US 2022/0389237 A1 Dec. 8, 2022

(30) Foreign Application Priority Data
Dec. 26, 2019 (JP) .................. 2019-237068

(51) Int. Cl.
*C09D 5/08* (2006.01)
*C09D 7/61* (2018.01)
*C09D 7/63* (2018.01)

(52) U.S. Cl.
CPC .............. *C09D 5/086* (2013.01); *C09D 7/61* (2018.01); *C09D 7/63* (2018.01)

(58) Field of Classification Search
CPC . C09D 5/086; C09D 7/61; C09D 7/63; C09D 5/08; C09D 5/082; C09D 129/04; C09D 133/02; C09D 133/26; C09D 201/02; C09D 133/08; C08K 3/11; C08K 5/315; C08K 2003/3045; C08L 2201/54; C08L 101/02; C08L 101/14; C08L 29/04; C08L 33/08; C08L 33/26; C23C 22/36; C23C 26/00; C23C 22/06; C23C 2222/10
See application file for complete search history.

(56) References Cited

U.S. PATENT DOCUMENTS

| | | | |
|---|---|---|---|
| 4,830,913 A | 5/1989 | Ortmans et al. | |
| 5,314,532 A | 5/1994 | Hughes et al. | |
| 5,753,316 A * | 5/1998 | Brent .................. | C09D 5/08 |
| | | | 427/388.1 |
| 2015/0232681 A1 | 8/2015 | Osako et al. | |

FOREIGN PATENT DOCUMENTS

| | | | |
|---|---|---|---|
| CN | 1396226 A | 2/2003 | |
| CN | 102741453 A | 10/2012 | |
| CN | 102741455 A | 10/2012 | |
| CN | 102877055 A | 1/2013 | |
| CN | 109370346 A | 2/2019 | |
| JP | S495823 B1 | 2/1974 | |
| JP | S54-142253 A | 11/1979 | |
| JP | H08-206594 A | 8/1996 | |
| JP | 2014-144456 A | 8/2014 | |
| KR | 20130009678 A * | 1/2013 | |
| WO | WO-2006/132385 A1 | 12/2006 | |
| WO | WO-2014/147782 A1 | 9/2014 | |

OTHER PUBLICATIONS

Hayaty, "Curing Behavior of Dicyandiamide/Epoxy Resin System Using Different Accelerators," 2013, Iran Polym. J., 22, pp. 591-598 (Year: 2013).*
Maitra et al., "Dicyandiamide—An Inhibitor for Acid Corrosion of Pure Aluminium", Corrosion Science, vol. 14, 1974, pp. 587-590.
Office Action in JP Application No. 2019-237068 dated Apr. 21, 2020, 9 pages.
Search Report in International Application No. PCT/JP2020/042131 dated Jan. 19, 2021, 4 pages.
Office Action in IN Application No. 202217026926 dated Sep. 7, 2022, 6 pages.
Extended European Search Report in EP Application No. 20907975.5 dated Nov. 7, 2022, 8 pages.
Office Action in CN Application No. 202080081648.X dated Apr. 30, 2025, 5 pages.

* cited by examiner

*Primary Examiner* — Robert S Jones, Jr.
*Assistant Examiner* — Joshua Caleb Bledsoe
(74) *Attorney, Agent, or Firm* — MARSHALL, GERSTEIN & BORUN LLP

(57) ABSTRACT

The present invention addresses the problem of providing: a metal surface treatment agent which can form a film having excellent corrosion resistance and excellent hydrophilicity on or over a surface of a metal material; a method of producing a metal material having a film by using the metal surface treatment agent; and a metal material having a film, which is obtained by the method. A chemical agent, which contains prescribed amounts of a water-soluble or water-dispersible resin (A) and a compound (B) having a nitrile group and an amino group, is capable of forming a film having excellent corrosion resistance and excellent hydrophilicity on or over a surface of a metal material and, therefore, can solve the above-described problem.

9 Claims, No Drawings

METAL SURFACE-TREATING AGENT, AND METAL MATERIAL WITH COATING FILM AND METHOD FOR MANUFACTURING SAME

TECHNICAL FIELD

The present invention relates to: a metal surface treatment agent; a method of producing a metal material having a film by using the metal surface treatment agent; and a metal material having a film, which is obtained by the method.

BACKGROUND ART

There have been developed metal surface treatment agents used for the formation of a film having excellent corrosion resistance on a metal material. For example, Patent Document 1 proposes an aqueous solution that contains a specific amphoteric polymer and a crosslinking agent containing a water-soluble chromium compound. Patent Document 2 proposes a resin-containing liquid having a pH of 1.5 to 3.0, which contains prescribed amounts of a specific carboxyl-containing resin, a vinyl monomer, and a persulfate ion or hydrogen peroxide.

RELATED ART DOCUMENTS

Patent Documents

[Patent Document 1] Japanese Unexamined Patent Application Publication No. H8-206594
[Patent Document 2] Japanese Unexamined Patent Application Publication No. S54-142253

SUMMARY OF THE INVENTION

Problems to be Solved by the Invention

However, a film formed by the aqueous solution disclosed in Patent Document 1 does not have sufficient corrosion resistance and is demanded to have superior performance. Further, a film formed by the resin-containing liquid disclosed in Patent Document 2 does not have sufficient hydrophilicity and is demanded to have superior performance. In view of this, an object of the present invention is to provide: a metal surface treatment agent which can form a film having excellent corrosion resistance and excellent hydrophilicity on or over a surface of a metal material; a method of producing a metal material having a film by using the metal surface treatment agent; and a metal material having a film, which is obtained by the method.

Means for Solving the Problems

The present inventors intensively studied to solve the above-described problems and consequently discovered that a film having excellent corrosion resistance and excellent hydrophilicity can be formed on or over a surface of a metal material by using a chemical agent containing a water-soluble or water-dispersible resin and a compound having a nitrile group and an amino group, thereby completing the present invention.

That is, the present invention encompasses the followings.
[1] A metal surface treatment agent, containing:
a water-soluble or water-dispersible resin (A); and
a compound (B) having a nitrile group and an amino group.

[2] The metal surface treatment agent according to [1], wherein a ratio $[B_M/A_M]$ between the mass $(A_M)$ of the resin (A) and the mass $(B_M)$ of the compound (B) is in a range of 0.03 to 1.50.
[3] The metal surface treatment agent according to [1] or [2], wherein the resin (A) is a resin containing at least one functional group selected from an amino group, an amide group, a carboxy group, and a hydroxy group.
[4] The metal surface treatment agent according to any one of [1] to [3], wherein the compound (B) has a molecular weight of 1,000 or less.
[5] The metal surface treatment agent according to any one of [1] to [4], further containing at least one inorganic compound (C) selected from a chromium compound, a vanadium compound, a titanium compound, and a zirconium compound,
wherein a ratio $[B_M/C_M]$ between the mass $(B_M)$ of the compound (B) and the mass $(C_M)$ of the inorganic compound (C) is in a range of 0.10 to 5.00.
[6] A method of producing a metal material having a film, the method including the steps of:
bringing the metal surface treatment agent according to any one of [1] to [5] into contact with or over a surface of a metal material; and
drying the metal surface treatment agent thus brought into contact with or over the surface of the metal material.
[7] A metal material having a film, which is obtained by the method according to [6].

Effects of the Invention

According to the present invention, the followings can be provided: a metal surface treatment agent which can form a film having excellent corrosion resistance and excellent hydrophilicity on or over a surface of a metal material; a method of producing a metal material having a film by using the metal surface treatment agent; and a metal material having a film, which is obtained by the method.

MODE FOR CARRYING OUT THE INVENTION

The metal surface treatment agent according to the present embodiment, a method of producing a metal material having a film by using the metal surface treatment agent, and a metal material having a film, which is obtained by the method, will now be described.
(Metal Surface Treatment Agent)
The metal surface treatment agent according to the present embodiment contains: a resin (A); and a compound (B) having a nitrile group and an amino group (hereinafter, simply referred to as "compound (B)"). By using this metal surface treatment agent, a film having excellent corrosion resistance and excellent hydrophilicity can be formed on or over a surface of a metal material.
<Resin (A)>
The resin (A) is not particularly limited as long as it is a water-soluble or water-dispersible resin, and examples thereof include urethane resins, polyvinyl alcohol resins, polyamide resins, epoxy resins, acrylic resins, amine resins, phenolic resins, and polyvinylpyrrolidone resins. The resin (A) may be a homopolymer of a urethane resin, a polyvinyl alcohol resin, a polyamide resin, an epoxy resin, a phenolic resin, a polyvinylpyrrolidone resin or the like; a modification product obtained by modifying a side chain of the homopolymer with other compound; or a copolymer of a combination of two or more of the above-described resins and modification product. Thereamong, it is particularly preferred to use a resin having a functional group such as an amino group, an amide group, a carboxy group, or a hydroxy group, more specifically a resin having a functional group directly bound to a carbon atom. Further, the weight-average molecular weight of the resin (A) is not particularly limited as long as it is not less than 2,000, and the weight-average molecular weight of the resin (A) is preferably not less than 4,000, more preferably not less than 10,000. An upper limit value thereof is preferably 1,000,000 or less. The resin (A) may contain any one of, or two or more of the above-described groups. Further, the metal surface treatment agent may be produced by blending any one of, or two or more of the above-described resins.

<Compound (B)>

The compound (B) is not particularly limited as long as it is a compound that has a nitrile group and an amino group and is different from the resin (A), and examples of the compound (B) include cyanamide, aminoacetonitrile, 3-aminopropionitrile, dicyandiamide, 3-aminocrotononitrile, 2-amino-1,1,3-tricyano-1-propene, 2-aminobenzonitrile, 3-aminobenzonitrile, 4-aminobenzonitrile, 2-aminobenzyl cyanide, 4-aminobenzyl cyanide, 2-amino-5-bromobenzonitrile, 2-amino-5-nitrobenzonitrile, 4-amino-3-bromobenzonitrile, 2-amino-4-chlorobenzonitrile, 2-amino-5-chlorobenzonitrile, 2-amino-4,5-dicyano-1H-imidazole, and 4-(aminomethyl)benzonitrile. The molecular weight of the compound (B) is preferably 1,000 or less, more preferably 800 or less, particularly preferably 500 or less. Further, it is preferred that the compound (B) is not a polymer having a repeating structure.

In the metal surface treatment agent according to the present embodiment, the content ratio of the resin (A) and the compound (B) is not particularly limited; however, a ratio $[B_M/A_M]$ between the mass $(A_M)$ of the resin (A) and the mass $(B_M)$ of the compound (B) is preferably in a range of 0.03 to 1.50, more preferably in a range of 0.10 to 1.00, particularly preferably in a range of 0.10 to 0.50. When the metal surface treatment agent contains two or more kinds of the resins (A) and/or two or more kinds of the compounds (B), a ratio $[B_M/A_M]$ calculated using a total mass of the respective components is preferably in the above-described range.

<Other Components>

The metal surface treatment agent according to the present embodiment may consist of only the resin (A) and the compound (B) in addition to an aqueous medium, or may further contain other component(s). Examples of the other components include an inorganic compound (C) and a surfactant. Further, the metal surface treatment agent according to the present embodiment may or may not contain hydrogen peroxide or a persulfate.

The inorganic compound (C) is, for example, a chromium compound, a vanadium compound, a titanium compound, or a zirconium compound. The chromium compound is not particularly limited as long as it is a compound containing elemental chromium, and examples thereof include chromium sulfate, chromium nitrate, chromium biphosphate, chromium fluoride, chromium acetate, chromium formate, chromic anhydride, and bichromatic acid. The vanadium compound is not particularly limited as long as it is a compound containing elemental vanadium, and examples thereof include vanadium pentoxide, ammonium metavanadate, sodium metavanadate, vanadium oxytrichloride, vanadium trioxide, vanadium dioxide, vanadium oxysulfate, vanadium oxyacetylacetonate, vanadium acetylacetonate, vanadyl acetylacetonate, vanadium trichloride, phosphovanadomolybdic acid, and vanadium sulfate. The titanium compound is not particularly limited as long as it is a compound containing elemental titanium, and examples thereof include titanyl sulfate, titanyl nitrate, titanium nitrate, titanyl chloride, titania sol, titanium oxide, titanium potassium oxalate, titanium lactate, titanium tetraisopropoxide, titanium acetylacetonate, diisopropyl titanium bisacetylacetone, and fluorotitanic acid and salts thereof, as well as metatitanic acid obtained by thermal hydrolysis of an aqueous titanyl sulfate solution, orthotitanic acid obtained by alkali neutralization of an aqueous titanyl sulfate solution, and salts of these acids. The zirconium compound is not particularly limited as long as it is a compound containing elemental zirconium, and examples thereof include zirconium nitrate, zirconium oxynitrate, zirconyl acetate, zirconyl sulfate, zirconyl ammonium carbonate, zirconyl potassium carbonate, zirconyl sodium carbonate, zirconia sol, and fluorozirconic acid and salts thereof, as well as zirconic acid obtained by ion exchange or alkali neutralization of an aqueous solution of a water-soluble zirconium salt, and salts of zirconic acid. The metal surface treatment agent may contain any one of, or two or more of these inorganic compounds.

When the metal surface treatment agent according to the present embodiment contains the inorganic compound (C), the content ratio of the compound (B) and the inorganic compound (C) in the metal surface treatment agent is not particularly limited; however, a ratio $[B_M/C_M]$ between the mass $(B_M)$ of the compound (B) and the mass $(C_M)$ of the inorganic compound (C) is preferably in a range of 0.10 to 5.00, more preferably in a range of 0.20 to 4.00, particularly preferably in a range of 0.30 to 3.00. When the metal surface treatment agent contains two or more kinds of the compounds (B) and/or two or more kinds of the inorganic compounds (C), a ratio $[B_M/C_M]$ calculated using a total mass of the respective components is preferably in the above-described range.

As the surfactant, a cationic, anionic, amphoteric, or nonionic surfactant can be used, and examples thereof include: cationic surfactants, such as alkylamine salts and alkyltrimethyl ammonium halides; anionic surfactants, such as alkyl sulfonates, polyoxyethylene alkylphenyl ether sulfates, sodium dodecyldiphenyl ether disulfonate, and sodium dodecyl sulfate; amphoteric surfactants, such as alkyl aminopropionates and alkyldimethyl betaines; and nonionic surfactants, such as polyoxyethylene alkylphenyl ethers, polyoxyalkylene fatty acid esters, fatty acid glycerin esters, sorbitan fatty acid esters, polyoxyethylene glycerin fatty acids, and polyoxyethylene propylene glycol fatty acid esters. These surfactants may be used singly, or in combination of two or more thereof.

<Aqueous Medium>

The aqueous medium is not particularly limited as long as it contains water in an amount of not less than 50% by mass, and the aqueous medium may consist of only water, or may be a mixture containing water and a water-miscible organic solvent. The water-miscible organic solvent is not particularly limited as long as it is miscible with water, and examples thereof include: ketone-based solvents, such as acetone and methyl ethyl ketone; amide-based solvents, such as N,N'-dimethylformamide and dimethylacetamide; alcohol-based solvents, such as methanol, ethanol, and isopropanol; ether-based solvents, such as ethylene glycol monobutyl ether and ethylene glycol monohexyl ether; and pyrrolidone-based solvents, such as 1-methyl-2-pyrrolidone and 1-ethyl-2-pyrrolidone. These water-miscible organic solvents may be mixed with water singly, or two or more thereof may be mixed with water.

(Method of Producing Metal Surface Treatment Agent)

The metal surface treatment agent according to the present embodiment can be produced by, for example, mixing prescribed amounts of the resin (A), the compound (B) and, as required, other component(s) in an aqueous medium.

(Metal Material Having Film and Production Method Thereof)

The method of producing a metal material having a film according to the present embodiment (hereinafter, simply referred to as "the production method according to the present embodiment") includes: the contact step of bringing the above-described metal surface treatment agent into contact with or over a surface of a metal material; and the drying step of drying the metal surface treatment agent thus brought into contact with or over the surface of the metal material. By this production method, a metal material which has a film having excellent corrosion resistance and excellent hydrophilicity on or over the surface can be obtained. In the production method according to the present embodiment, the degreasing step and/or the chemical conversion treatment step may be performed before the contact step.

<Metal Material>

The shape, the structure and the like of the metal material on which a film is to be formed are not particularly limited, and the metal material may be in the form of, for example, a plate or a foil. The type of the metal material is also not particularly limited, and examples thereof include: steel materials (e.g., cold-rolled steel sheets and hot-rolled steel sheets); plated materials, such as zinc-plated materials (e.g., electrogalvanized materials, hot-dip galvanized materials, aluminum-containing galvanized materials, electrogalvanized materials, zinc-nickel plated materials, zinc-cobalt plated materials, and zinc vapor-deposited materials), zinc alloy-plated materials (e.g., alloyed hot-dip galvanized materials, Zn—Al alloy-plated materials, Zn—Al—Mg alloy-plated materials, and zinc alloy-electroplated materials), aluminum-plated materials, nickel-plated materials, tin-plated materials, chromium-plated materials, and chromium alloy-plated materials (e.g., Cr—Ni alloy-plated materials); aluminum materials and aluminum alloy materials (e.g., 1,000 series, 2,000 series, 3,000 series, 4,000 series, 5,000 series, 6,000 series, aluminum casts, aluminum alloy casts, and die-cast materials); copper materials and copper alloy materials; titanium materials and titanium alloy materials; and magnesium materials and magnesium alloy materials.

<Contact Step>

Examples of a contact method include, but not limited to: a spray method, an immersion method, a roll coating method, a bar coating method, a curtain coating method, a spin coating method, and a combination of these methods. The contact temperature and the contact time are set as appropriate in accordance with the formulation and the concentration of the metal surface treatment agent. The contact temperature and the contact time are usually, but not limited to: in a range of 10° C. to 45° C. and in a range of 5 seconds to 600 seconds, respectively.

<Drying Step>

A drying method is not particularly limited, and examples thereof include drying methods using a known drying equipment, such as a batch-type drying furnace, a continuous hot air circulation-type drying furnace, a conveyer-type hot-air drying furnace, or an electromagnetic induction heating furnace using an IH heater. The drying temperature and the drying time are set as appropriate in accordance with the type of the metal material and the formulation or the amount of the metal surface treatment agent brought into contact with the metal material. The drying temperature is not particularly limited; however, usually, the peak metal temperature (PMT) of the metal material is preferably in a range of 100° C. to 200° C., more preferably in a range of 130° C. to 170° C. The drying time is also not particularly limited; however, it is in a range of 2 seconds to 1,800 seconds.

<Degreasing Step>

As a degreasing method, any method may be employed as long as oils/fats and dirt adhering to the surface of the metal material can be removed, and examples of such a method include solvent degreasing and known methods using an alkali-based or acid-based degreasing agent or the like. In cases where the contact step or the chemical conversion treatment step is performed after the degreasing step, the water washing step may or may not be performed on or over the surface of the metal material after the degreasing step but before the contact step or the chemical conversion treatment step. When the water washing step is performed, drying may or may not be subsequently performed on or over the surface of the metal material.

<Chemical Conversion Treatment Step>

The chemical conversion treatment step is not particularly limited as long as it is a treatment of forming a chemical conversion coating, and examples thereof include the zirconium chemical conversion treatment step, the titanium chemical conversion treatment step, the hafnium chemical conversion treatment step, the phosphate chemical conversion treatment step, and the chromate chemical conversion treatment step. The water washing step may or may not be performed on or over the surface of the metal material after the chemical conversion treatment step but before the contact step. When the water washing step is performed, drying may or may not be subsequently performed on or over the surface of the metal material. In cases where the phosphate chemical conversion treatment step using zinc phosphate is performed as the chemical conversion treatment step, the surface-adjusting treatment step may be performed on the metal material between the degreasing step and the phosphate chemical conversion treatment step for the purpose of improving the reactivity of the phosphate chemical conversion treatment. Any known method can be employed as a surface-adjusting treatment method of this step.

The chemical conversion treatment step is performed by bringing a chemical conversion agent into contact with or over the surface of the metal material. Examples of the chemical conversion agent include, but not limited to: zirconium chemical conversion agents, titanium chemical conversion agents, hafnium chemical conversion agents, phosphate chemical conversion agents, and chromate chemical conversion agents. Examples of a method of bringing the chemical conversion agent into contact include, but not limited to: known contact methods such as an immersion treatment method, a spray treatment method, a pouring method, and a combination of these methods. In the above-described various chemical conversion treatment steps, the temperature and the contact time of the chemical conversion agent can be set as appropriate in accordance with the type of the chemical conversion treatment step as well as the concentration and the like of the chemical conversion agent.

<Film>

The adhesion amount of the film formed by the metal surface treatment agent on or over the surface of the metal material is not particularly limited as long as the performance of the present invention can be exerted; however, it is, for example, preferably in a range of 0.05 g/m$^2$ to 1.5 g/m$^2$, more preferably in a range of 0.1 g/m$^2$ to 1.0 g/m$^2$. It is noted here that, between the metal material and the film, a chemical conversion coating obtained by the above-described chemical conversion treatment step may further be provided.

EXAMPLES

The present invention will now be described in more detail by way of Examples and Comparative Examples. It is noted here, however, that the present invention is not limited to the below-described Examples.

(Preparation of Metal Surface Treatment Agents)

A water-soluble or water-dispersible resin, a nitrile compound, and an inorganic compound in the respective prescribed amounts shown in Table 1 were added to deionized water in the order mentioned, and a surfactant (ADEKA PLURONIC L-61, manufactured by ADEKA Corporation) was further added to a final concentration of 10 g/L. Subsequently, deionized water was further added to the resultant such that a total mass of the water-soluble or water-dispersible resin, the nitrile compound, the inorganic compound, and the surfactant was 100 g/L, whereby metal surface treatment agents of Examples 1 to 11 and Comparative Examples 1 to 5 were produced. The components represented by the respective symbols in the columns of "Type" in Table 1 are listed below.

<Inorganic Compounds>
C1: chromium sulfate
C2: vanadium oxysulfate (Preparation of Evaluation Samples No. 1 to 16)

As test materials, aluminum sheets (1050, thickness: 0.6 mm) were each immersed in an alkali-based degreasing agent [FINE CLEANER 315E (manufactured by Nihon Parkerizing Co., Ltd.) dissolved in water at a mass concentration of 2%] at 60° C. for 2 minutes to perform a degreasing treatment. Subsequently, the surface of each test material was washed with water.

The test materials, which had been thus degreased and washed with water, were each immersed in a zirconium-based chemical conversion agent [PALCOAT 3762 (manufactured by Nihon Parkerizing Co., Ltd.) dissolved in water at a mass concentration of 5% and adjusted to have a pH of 4.0] at 60° C. for 2 minutes to perform a chemical conversion treatment. After the chemical conversion treatment, the surface of each test material was washed with water.

The test materials, on which a chemical conversion coating had been formed by the chemical conversion treatment, were immersed in the respective metal surface treatment agents (metal surface treatment agents of Examples 1 to 11 and Comparative Examples 1 to 5) at 25° C. for 10 seconds

TABLE 1

| | Water-soluble or Water-dispersible resin | | Nitrile Compound | | | Inorganic Compound | | |
|---|---|---|---|---|---|---|---|---|
| | Kinds | Parts by Mass | Kinds | Parts by Mass | $B_M/A_M$ | Kinds | Parts by Mass | $B_M/C_M$ |
| Example 1 | A1 | 30 | B1 | 10 | 0.33 | | | |
| Example 2 | A2 | 30 | B1 | 10 | 0.33 | | | |
| Example 3 | A3 | 30 | B1 | 10 | 0.33 | | | |
| Example 4 | A1 | 30 | B2 | 10 | 0.33 | | | |
| Example 5 | A1 | 30 | B1 | 4 | 0.13 | C1 | 7.1 | 0.56 |
| Example 6 | A1 | 30 | B1 | 4 | 0.13 | C2 | 7.1 | 0.56 |
| Example 7 | A1 | 40 | B1 | 2 | 0.05 | C1 | 6.1 | 0.33 |
| Example 8 | A1 | 30 | B1 | 10 | 0.33 | C1 | 5 | 2.00 |
| Example 9 | A1 | 20 | B1 | 20 | 1.00 | | | |
| Example 10 | A1 | 30 | B1 | 45 | 1.50 | | | |
| Example 11 | A1 | 30 | B1 | 1 | 0.03 | | | |
| Comparative Example 1 | A1 | 30 | | | 0.00 | | | |
| Comparative Example 2 | | | B1 | 30 | | | | |
| Comparative Example 3 | | | B1 | 10 | | C1 | 7.1 | 0.56 |
| Comparative Example 4 | A1 | 30 | B3 | 10 | 0.33 | | | |
| Comparative Example 5 | A1 | 30 | B4 | 10 | 0.33 | | | |

<Water-Soluble or Water-Dispersible Resins>

A1: polyvinyl alcohol (KURARAY POVAL PVA-103, manufactured by Kuraray Co., Ltd.)

A2: polyacrylic acid (AQUALIC DL-40S, manufactured by Nippon Shokubai Co., Ltd.)

A3: polyacrylamide (POLYSTRON 387-20, manufactured by Arakawa Chemical Industries, Ltd.)

<Nitrile Compounds>

B1: dicyandiamide (dicyandiamide, manufactured by Nippon Carbide Industries Co., Ltd.)

B2: aminopropionitrile (manufactured by Tokyo Chemical Industry Co., Ltd.)

B3: propionitrile (propanenitrile, manufactured by Yoneyama Yakuhin Kogyo Co., Ltd.)

B4: acrylonitrile-butadiene latex (1571C2, manufactured by Zeon Corporation)

and subsequently heat-dried at 150° C. for 6 minutes using a blow dryer, whereby test materials having a film (evaluation samples No. 1 to 16) were produced.

(Preparation of Evaluation Samples No. 17 to 32)

As test materials, 55% aluminum-zinc-plated steel sheets (sheet thickness: 0.35 mm) were each immersed in an alkali-based degreasing agent [FINE CLEANER 6404 (manufactured by Nihon Parkerizing Co., Ltd.) dissolved in water at a mass concentration of 2%] at 60° C. for 30 seconds to perform a degreasing treatment. Subsequently, the surface of each test material was washed with water.

The test materials, which had been thus degreased and washed with water, were immersed in the respective metal surface treatment agents (metal surface treatment agents of Examples 1 to 11 and Comparative Examples 1 to 5) at 25° C. for 10 seconds and subsequently heat-dried at 150° C. for 6 minutes using a blow dryer, whereby test materials having a film (evaluation samples No. 17 to 32) were produced.

(Method of Evaluating Corrosion Resistance)

<Neutral Salt Spray Test: SST>

Based on a salt spray test method (JIS Z2371:2015), the area ratio (%) of white rust generated on the surface of each evaluation sample after 240-hour spraying with salt water was determined, and the corrosion resistance (SST) was evaluated in accordance with the following evaluation criteria. An evaluation result of B or better was regarded as satisfactory.

<Acetic Acid Salt Spray Test: AASST>

Based on a salt spray test method (JIS Z2371:2015), the area ratio (%) of white rust generated on the surface of each evaluation sample after 240-hour spraying with an aqueous solution, which was prepared by adjusting the pH of a copper (II) chloride-containing salt solution with acetic acid to be 3.0, was determined, and the corrosion resistance (AASST) was evaluated in accordance with the following evaluation criteria.

<Evaluation Criteria>

A: The area ratio was lower than 10%.

B: The area ratio was 10% or higher but lower than 20%.

C: The area ratio was 20% or higher.

(Method of Evaluating Initial Hydrophilicity)

One droplet of water was dropped onto the surface of each evaluation sample, and the contact angle immediately thereafter was measured using a contact angle meter to evaluate the initial hydrophilicity in accordance with the following evaluation criteria.

<Evaluation Criteria>

A: The contact angle was smaller than 10°.

B: The contact angle was 10° or larger but smaller than 30°.

C: The contact angle was 30° or larger.

(Method of Evaluating Durable Hydrophilicity)

After drying the surface of each evaluation sample immersed in water for 96 hours, one droplet of water was dropped thereon, and the contact angle immediately thereafter was measured using a contact angle meter to evaluate the durable hydrophilicity in accordance with the following evaluation criteria.

<Evaluation Criteria>

A: The contact angle was smaller than 20°.

B: The contact angle was 20° or larger but smaller than 40°.

C: The contact angle was 40° or larger.

(Method of Evaluating Adhesion)

The surface of each evaluation sample was reciprocally rubbed with a water-wetted gauze while pressing the gauze against the surface with a load of 500 g. The number of reciprocation that caused peeling was measured, and the initial adhesion was evaluated in accordance with the following evaluation criteria. Further, after drying the surface of each evaluation sample immersed in water for 96 hours, a prescribed area of the surface was reciprocally rubbed with a water-wetted gauze while pressing the gauze against the surface with a load of 500 g. The number of reciprocation that caused peeling was measured, and the durable adhesion was evaluated in accordance with the following evaluation criteria.

<Evaluation Criteria>

A: The number of reciprocation was 20 or more.

B: The number of reciprocation was 10 or more but less than 20.

C: The number of reciprocation was less than 10.

(Method of Evaluating Water Resistance)

After drying the surface of each evaluation sample immersed in water for 96 hours, the mass ($E_M$) of the evaluation sample was measured, and the rate of change with respect to the mass ($S_M$) prior to the immersion in water, $[(1-E_M/S_M) \times 100]$, was calculated to evaluate the water resistance in accordance with the following evaluation criteria.

<Evaluation Criteria>

A: The rate of change was 10% or lower.

B: The rate of change was higher than 10% but 25% or lower.

C: The rate of change was higher than 25%.

(Discoloration Resistance)

Based on a salt spray test method (JIS Z2371:2015), the area ratio (%) of black discoloration that occurred on the surface of each evaluation sample after 72-hour spraying with a neutral salt water was determined, and the discoloration resistance was evaluated in accordance with the following evaluation criteria. An evaluation result of B or better was regarded as satisfactory.

<Evaluation Criteria>

A: The area ratio was 10% or lower.

B: The area ratio was higher than 10% but 30% or lower.

C: The area ratio was higher than 30%.

Tables 2 and 3 show the results of evaluating the corrosion resistance, the hydrophilicity, the adhesion, the water resistance, and the discoloration resistance for each evaluation sample. An evaluation result of B or better was regarded as satisfactory.

TABLE 2

| Evaluation Sample | Metal Sueface Treatment Agent | Corrosion Resistance | | Hydrophilicity | | Adhesion | | Water Resistance | Discoloration Resistance |
|---|---|---|---|---|---|---|---|---|---|
| | | SST | AASST | Initial | Durable | Initial | Durable | | |
| No. 1 | Example 1 | A | B | A | A | A | B | A | B |
| No. 2 | Example 2 | A | B | A | A | A | B | A | B |
| No. 3 | Example 3 | A | B | A | A | A | B | A | B |
| No. 4 | Example 4 | A | B | A | A | A | B | A | B |
| No. 5 | Example 5 | A | A | A | A | A | A | A | A |
| No. 6 | Example 6 | A | A | A | A | A | A | A | A |
| No. 7 | Example 7 | A | A | A | A | A | A | A | A |
| No. 8 | Example 8 | A | A | A | A | A | A | A | A |
| No. 9 | Example 9 | A | B | A | A | A | B | A | B |
| No. 10 | Example 10 | B | B | A | A | B | B | B | B |
| No. 11 | Example 11 | B | B | B | B | A | B | A | B |
| No. 12 | Comparative Example 1 | C | C | B | B | A | C | B | C |

TABLE 2-continued

| Evaluation Sample | Metal Sueface Treatment Agent | Corrosion Resistance | | Hydrophilicity | | Adhesion | | Water Resistance | Discoloration Resistance |
|---|---|---|---|---|---|---|---|---|---|
| | | SST | AASST | Initial | Durable | Initial | Durable | | |
| No. 13 | Comparative Example 2 | C | C | B | C | C | C | C | C |
| No. 14 | Comparative Example 3 | B | C | B | C | B | B | B | C |
| No. 15 | Comparative Example 4 | A | B | B | C | A | B | B | C |
| No. 16 | Comparative Example 5 | A | B | C | C | A | A | A | C |

TABLE 3

| Evaluation Sample | Metal Sueface Treatment Agent | Corrosion Resistance | Hydrophilicity | | Adhesion | | Water Resistance | Discoloration Resistance |
|---|---|---|---|---|---|---|---|---|
| | | SST | Initial | Durable | Initial | Durable | | |
| No. 17 | Example 1 | A | A | A | A | B | A | B |
| No. 18 | Example 2 | A | A | A | A | B | A | B |
| No. 19 | Example 3 | A | A | A | A | B | A | B |
| No. 20 | Example 4 | A | A | A | A | B | A | B |
| No. 21 | Example 5 | A | A | A | A | A | A | A |
| No. 22 | Example 6 | A | A | A | A | A | A | A |
| No. 23 | Example 7 | A | A | A | A | A | A | A |
| No. 24 | Example 8 | A | A | A | A | A | A | A |
| No. 25 | Example 9 | A | A | A | A | B | A | B |
| No. 26 | Example 10 | B | A | A | B | B | B | B |
| No. 27 | Example 11 | B | A | A | B | B | B | B |
| No. 28 | Comparative Example 1 | C | B | B | A | C | B | C |
| No. 29 | Comparative Example 2 | C | B | C | C | C | C | C |
| No. 30 | Comparative Example 3 | C | B | B | A | C | B | C |
| No. 31 | Comparative Example 4 | C | B | C | C | C | B | C |
| No. 32 | Comparative Example 5 | A | C | C | A | A | A | C |

The present invention has been described above in detail referring to concrete Examples thereof; however, it is obvious to those skilled in the art that various modifications and changes can be made without departing from the gist and the scope of the present invention.

The invention claimed is:

1. A metal surface treatment agent, comprising:
a water-soluble or water-dispersible resin (A);
a compound (B) comprising a nitrile group and an amino group, and
at least one inorganic compound (C) selected from a chromium compound, a vanadium compound, and a zirconium compound,
wherein a ratio $[B_M/A_M]$ between a mass $(A_M)$ of the resin (A) and a mass $(B_M)$ of the compound (B) is in a range of 0.13 to 1.50, with a proviso that the compound (B) is not a polymer having a repeating structure, and
wherein the metal surface treatment agent comprises no epoxy resin.

2. The metal surface treatment agent according to claim 1, wherein the resin (A) is a resin comprising at least one functional group selected from an amino group, an amide group, a carboxy group, and a hydroxy group.

3. The metal surface treatment agent according to claim 1, wherein the compound (B) has a molecular weight of 1,000 or less.

4. The metal surface treatment agent according to claim 1, wherein a ratio $[B_M/C_M]$ between the mass $(B_M)$ of the compound (B) and a mass $(C_M)$ of the inorganic compound (C) is in a range of 0.10 to 5.00.

5. A method of producing a metal material comprising a film, the method comprising the steps of:
bringing the metal surface treatment agent according to claim 1 into contact with or over a surface of a metal material; and
drying the metal surface treatment agent thus brought into contact with or over the surface of the metal material.

6. A metal material comprising a film, which is obtained by the method according to claim 5.

7. The metal surface treatment agent according to claim 1, wherein the chromium compound is at least one selected from the group consisting of chromium sulfate, chromium nitrate, chromium biphosphate, chromium fluoride, chromium acetate, chromium formate, chromic anhydride, and bichromatic acid.

8. The metal surface treatment agent according to claim 1, wherein the vanadium compound is at least one selected from the group consisting of vanadium pentoxide, ammonium metavanadate, sodium metavanadate, vanadium oxytrichloride, vanadium trioxide, vanadium dioxide, vanadium oxysulfate, vanadium acetylacetonate, vanadyl acetylacetonate, vanadium trichloride, phosphovanadomolybdic acid, and vanadium sulfate.

9. The metal surface treatment agent according to claim 1, wherein the zirconium compound is at least one selected from the group consisting of zirconium nitrate, zirconium oxynitrate, zirconyl acetate, zirconyl sulfate, zirconyl ammonium carbonate, zirconyl potassium carbonate, zirconyl sodium carbonate, zirconia sol, a fluorozirconic acid and salts thereof, a zirconic acid obtained by ion exchange or alkali neutralization of an aqueous solution of a water-soluble zirconium salt, and salts of the zirconic acid.

* * * * *